United States Patent [19]

Grooms

[11] Patent Number: 5,044,836
[45] Date of Patent: Sep. 3, 1991

[54] ELECTRIC AIR ADMISSION CONTROLLER

[75] Inventor: John M. Grooms, Rochester, Ind.

[73] Assignee: Burton Mechanical Contractors, Inc., Rochester, Ind.

[21] Appl. No.: 491,255

[22] Filed: Mar. 9, 1990

[51] Int. Cl.$^5$ .............................................. B01D 1/00
[52] U.S. Cl. ........................................ 406/22; 406/48; 406/93
[58] Field of Search .................... 406/14, 15, 18, 19, 406/22, 48, 50, 93; 137/236.1, 209

[56]  References Cited
U.S. PATENT DOCUMENTS

| 1,964,167 | 6/1934 | Needham | 406/22 |
| 3,814,542 | 6/1974 | Inglesias et al. | 406/15 |
| 4,171,853 | 10/1979 | Cleaver et al. | 406/48 |
| 4,179,371 | 12/1979 | Foreman et al. | 406/50 |
| 4,261,672 | 4/1981 | Marbach | 406/50 |
| 4,775,267 | 10/1988 | Yamamoto | 406/50 |

Primary Examiner—Sherman Basinger
Assistant Examiner—Stephen P. Avila
Attorney, Agent, or Firm—Jones, Day, Reavis & Pogue

[57] ABSTRACT

An electric air admission controller ("EAAC") for automatically opening and closing an air control valve connected to a vacuum sewage transport conduit with a sewage control valve, independently of the level of accumulated sewage upstream of the sewage control valve, in order to inject additional air at atmospheric pressure into the vacuum transport lines to apply additional fluid pressure to a mass of sewage therein, and to avoid a waterlogged condition by supplementary transport. In its simplest form, the EAAC system consists of a timer unit which, when activated, causes a solenoid valve to deliver vacuum/subatmospheric pressure or atmospheric pressure to the air control valve to open or close it, respectively, by application of differential pressure. Rather than rely upon the timer unit to determine a valve cycling frequency which will, on average, prevent waterlogging, however, a timer-delay module and pressure switch may be added to the system. The EAAC unit cycles the air control valve only when the pressure switch detects an inadequate level of differential pressure in the transport conduit, and the timer-delay unit provides a delay cycle before and after the air transport cycle to avoid unnecessary cycling of the air control valve. Finally, the EAAC system may be combined with the sensor-controller module, which normally cycles the sewage control valve, thereby making special air control valves unnecessary for delivering air to the sewage transport conduit to prevent waterlogging.

21 Claims, 6 Drawing Sheets

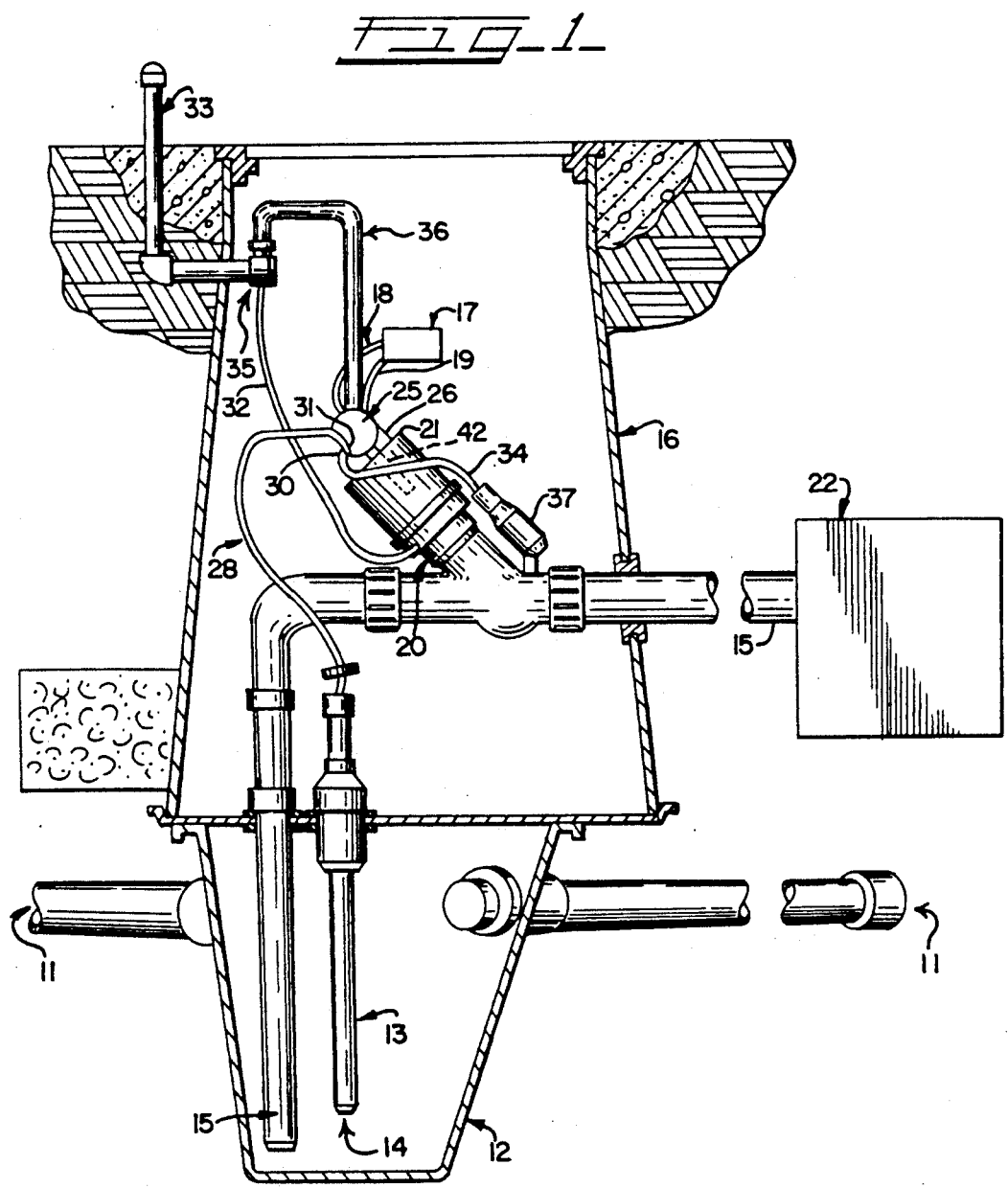

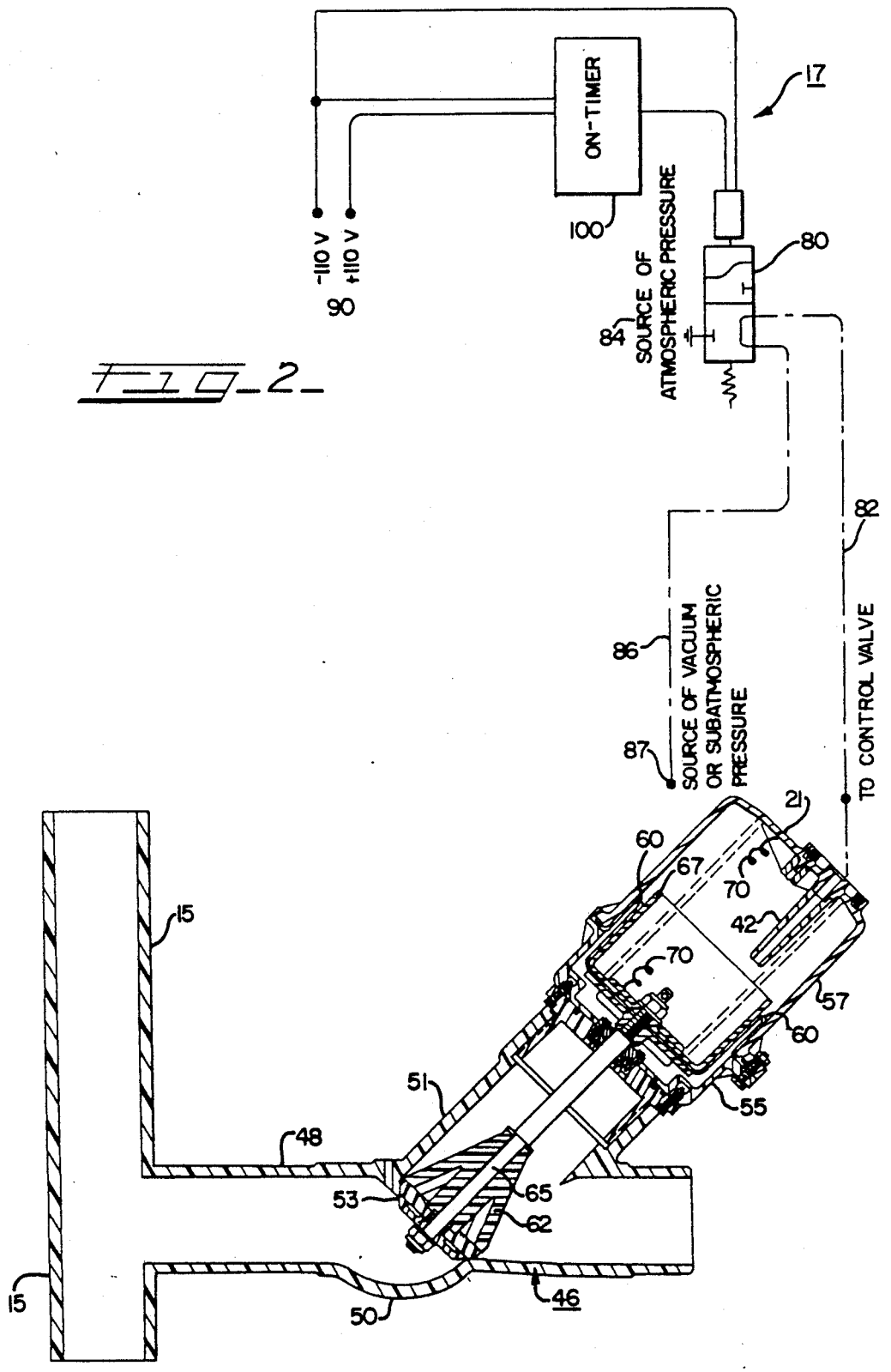

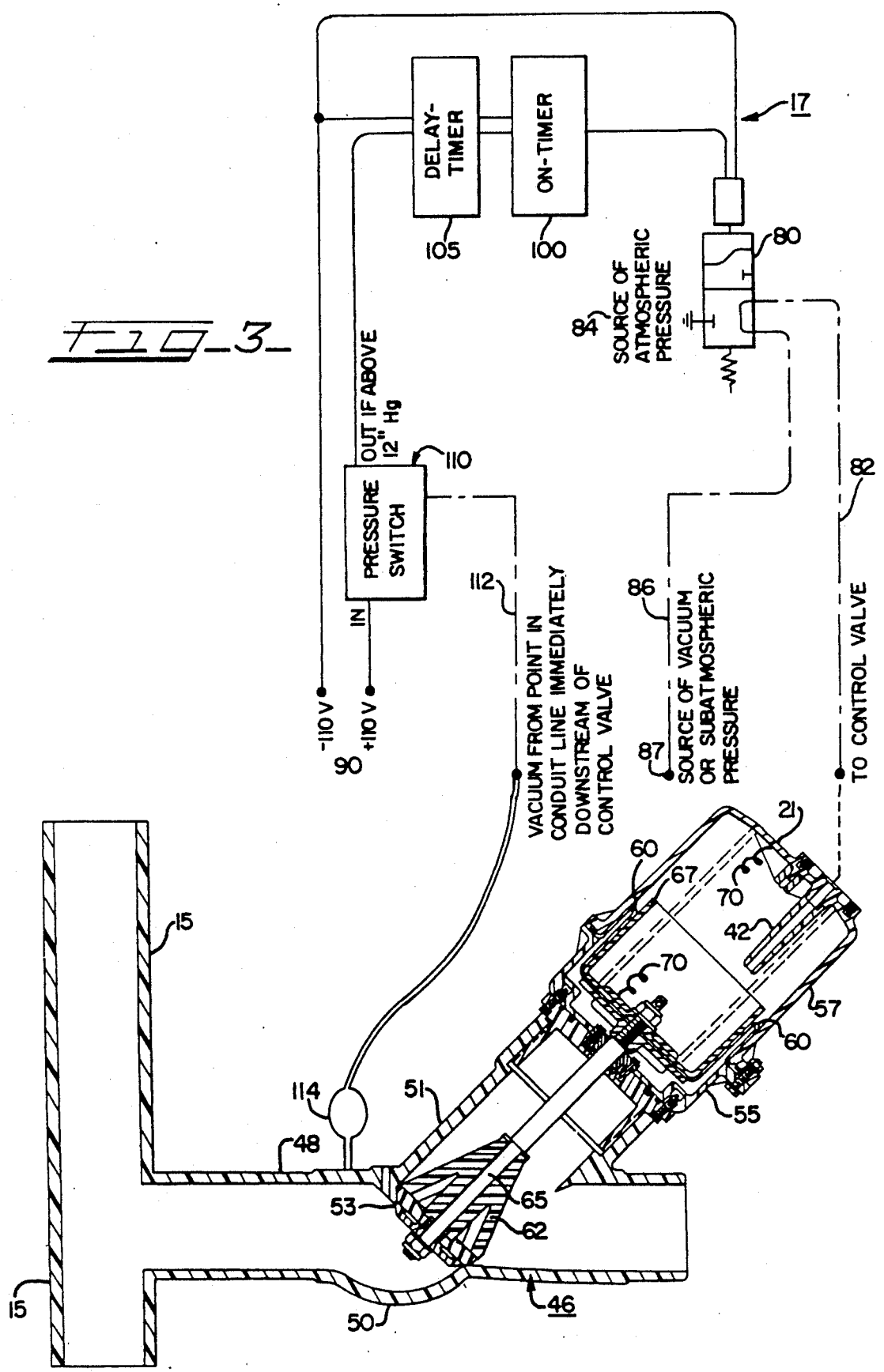

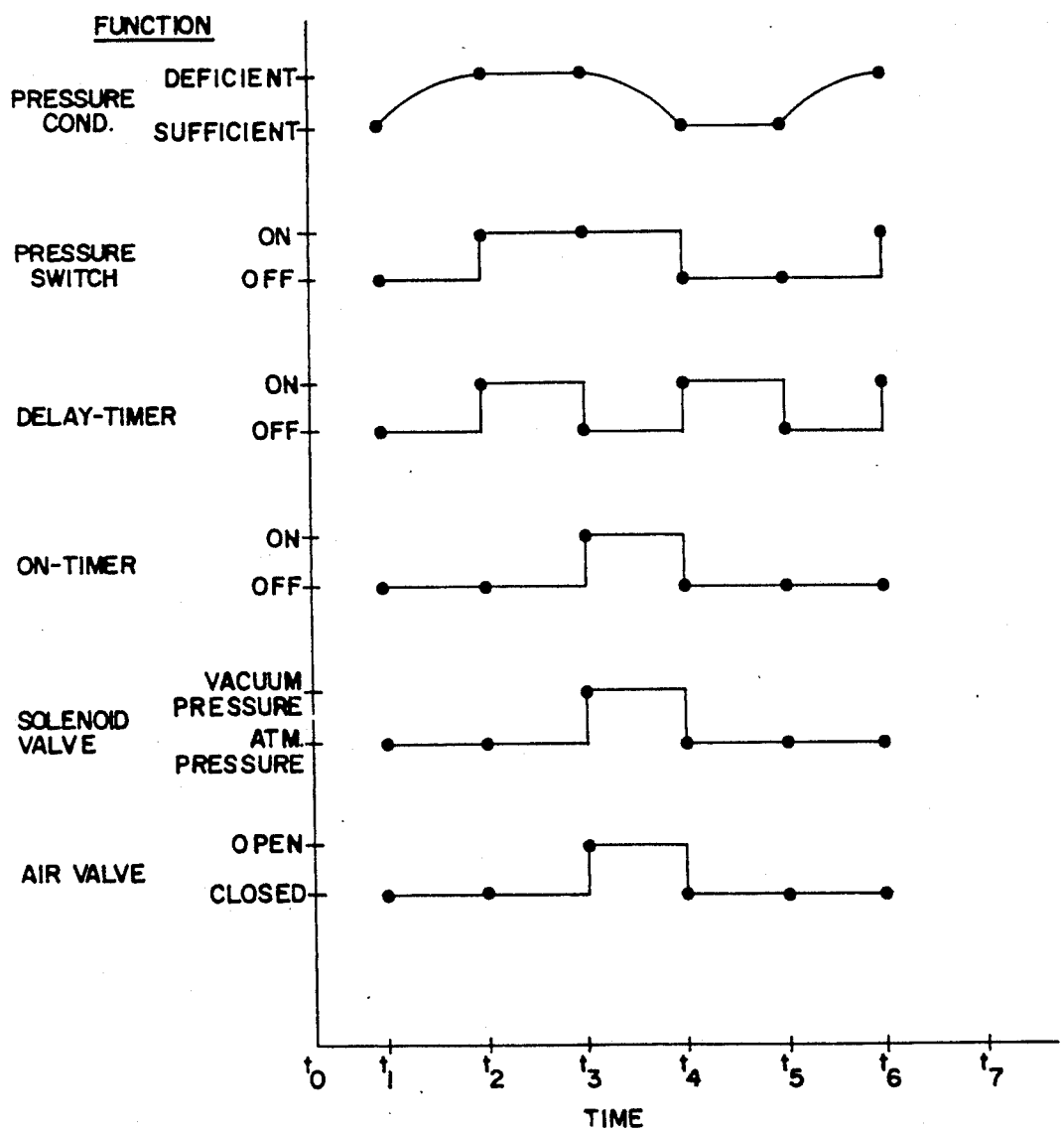

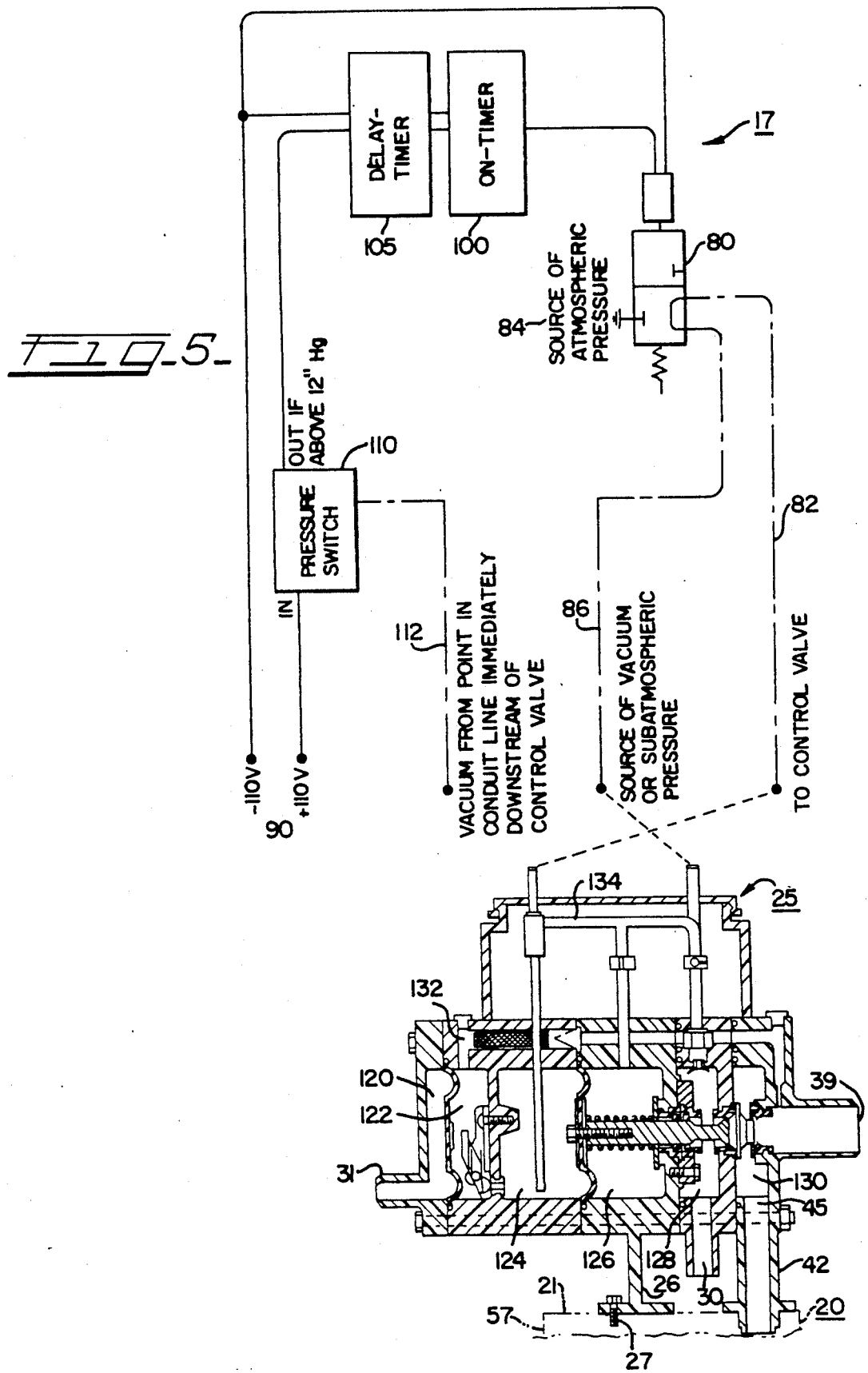

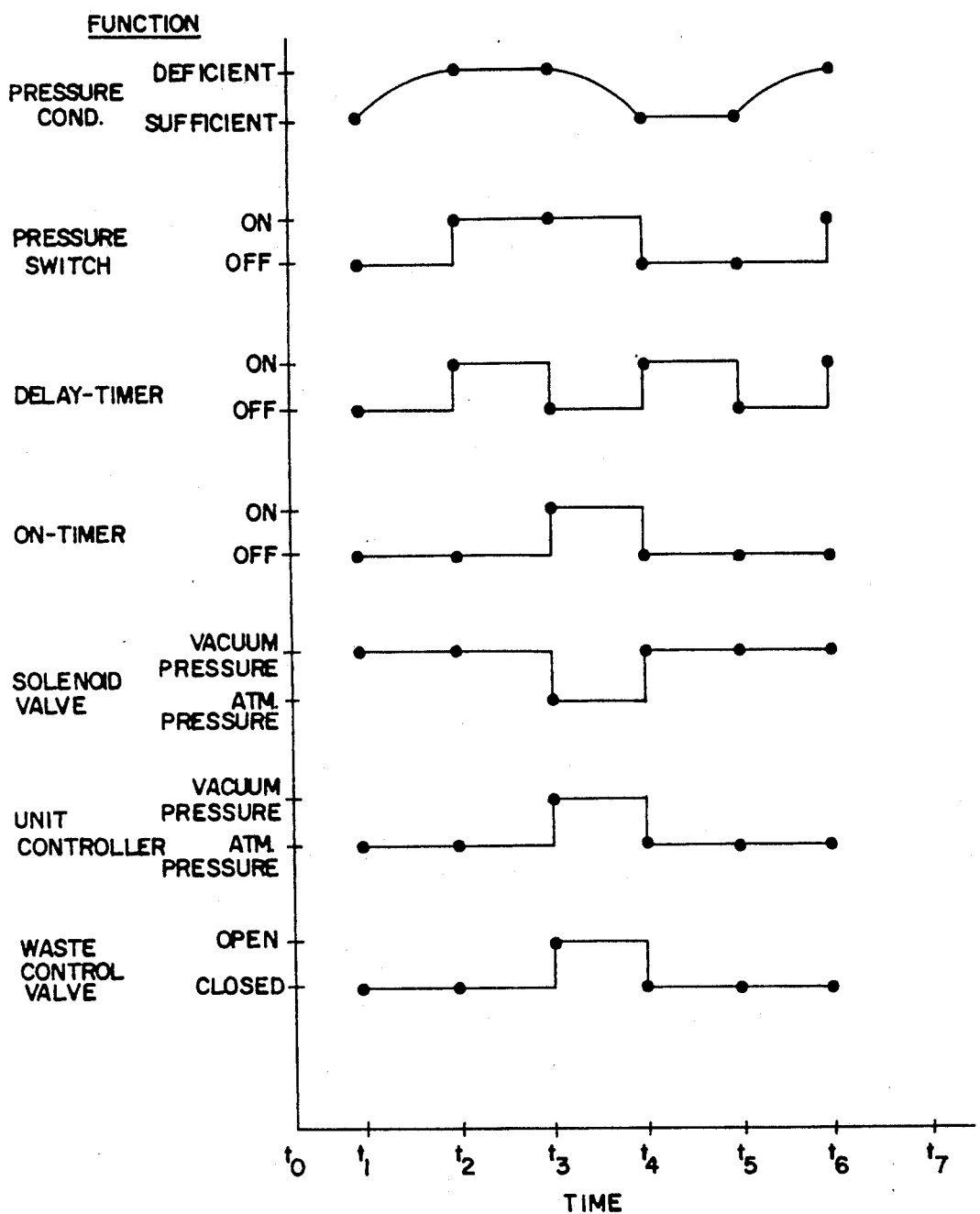
FIG_6

ELECTRIC AIR ADMISSION CONTROLLER

BACKGROUND OF THE INVENTION

The present invention relates generally to vacuum-operated sewage control systems utilizing inlet vacuum valves, and more specifically to such a system employing an electric air admission controller ("EAAC") for opening the vacuum valve independently of the level of sewage accumulated in a holding tank at the inlet of the valve, in order to introduce additional air at atmospheric pressure into the sewage transport conduit to avoid a waterlogged state.

An operational vacuum sewage transport system requires that each sewage inlet point, typically serving one or more houses, include a vacuum valve and controller assembly, which allows intermittent passage of accumulated sewage into an associated transportation conduit network connected at the other end to a collection tank, and thereafter ultimately to a sewage treatment plant. As disclosed in U.S. Pat. No. 4,179,371, issued to B. E. Foreman et al., this conduit is typically laid with a saw-toothed profile with a combination of a riser, low point, and downslope (collectively called a "lift") repeated throughout the length of the sewer main to accommodate the topography (e.g., other conduits and rock layers), as well as incoming flows (from an individual vacuum valve or a branch main). The slope of the downslope portions of the profile is such that the drop between lifts is generally equivalent to at least 40% of the conduit diameter (80% if the diameter is smaller than 6") or 0.2% of the distance between lifts, whichever is greater. Generally, the transport conduit network is continuously maintained under vacuum or subatmospheric pressure. Sewage and air, usually at atmospheric pressure, are introduced for transport into the conduit through an open vacuum valve. The air moves down the length of the conduit to the area under vacuum or subatmospheric pressure where the air expands volumetrically. The energy created by the rapid movement of air in response to the differential pressure condition in the conduit in turn produces rapid sewage transport throughout the conduit system.

At a predetermined point in time, however, the vacuum valve will close, thereby ending the sewage transport cycle. The expansion of air causes a reduction in its pressure and velocity, and any residual waste not transported through the conduit network during the sewage transport cycle comes to rest. The conduit downstream of the vacuum valve is equalized by the source of vacuum pressure to a substantially constant subatmospheric or vacuum pressure condition throughout. Any residual waste not transported through the conduit during the sewage transport cycle will generally come to rest in the low point portion, permitting vacuum or subatmospheric pressure to be communicated and maintained throughout the entire conduit section.

Vacuum valves function within this system by sealing and unsealing the passage between two parts of an evacuated system to define a transport cycle. The general structure and method of operation of this type of vacuum valve is described in U.S. Pat. No. 4,171,853, issued to D. D. Cleaver et al.

A problem encountered by vacuum transport sewage systems is "waterlogging." As already discussed, the collection of residual waste material in the low point portions of the conduit, under normal operating conditions, is insufficient to seal the conduit at low points, and is designed to maintain throughout the conduit an air space in the conduit to permit pressure communication. During a sewage transport cycle, the total conduit volume will typically be less than one-third liquid. However, if an insufficient amount of atmospheric air is introduced into the conduit, there will be insufficient energy applied to move effectively the entire waste mass during the sewage transport cycle. This leads to an increased accumulation of residual waste material, creating the waterlogged condition that might fill two-thirds of the conduit and lift volumes.

There are a number of potential causes of waterlogging. For example, the valve assembly may be misadjusted so that the valve closes too quickly after the waste material has entered the conduit, thereby undesirably reducing the amount of atmospheric air entering the conduit and pulling the waste material along. Likewise, leakage somewhere in the system will impair the maintenance of vacuum or subatmospheric pressure in the conduit so that, over time, this vacuum or subatmospheric pressure condition will decrease to the point that the differential pressure during transport cycles will be insufficient to move waste product, resulting in waterlogging. Also, while the conduit network will equalize to a vacuum or subatmospheric pressure after the valve closes, terminating the sewage transport cycle, it will do so at a slightly lower vacuum pressure due to inefficiency in the system or improper operation of the source of vacuum or subatmospheric pressure. This, in turn, contributes to a deficient level of vacuum or subatmospheric pressure and, therefore, pressure differential.

While waterlogging theoretically may occur no matter how many feet of lift are in the conduit line, the probability will increase as the "total lift" is increased, because it will be more difficult for gravity fall and the vacuum to lift sewage within the conduit lines at each succeeding profile change. Assuming that each saw-toothed lift consists of a lower downslope portion, a riser, and an upper downslope portion, the pertinent distance is measured vertically between the point on the bottom exterior surface of the upper downslope portion where it joins the riser, and the point on the top exterior surface of the lower downslope portion where it joins the riser. Aggregating these distances across the lifts of the flow path produces a measurement for the "total lift."

Typically, a vacuum system operates within a range of 16" Hg to 20" Hg vacuum. Because atmospheric pressure, on the other hand, is defined as 0" Hg in this vacuum pressure scale, this represents "a pressure differential" of 16" Hg to 20" Hg also. Taking the minimum available vacuum level of 16" Hg, and subtracting 5" Hg which must be present at all times to operate the vacuum valves and their controls leaves 11" Hg vacuum available for vacuum lift in the mains. Eleven inches of mercury is equivalent to 12.5 feet of water, which is typically rounded up to 13 feet. Thus, 13 feet of lift is typically the maximum figure used in the design of the vacuum mains for any sewer project.

Total lift of approximately 13 feet is important for two reasons. First, any system with less than 13 feet of lift which waterlogs can theoretically correct itself over time through normal valve cycling to purge the accumulated residual sewage from the conduit line. By contrast, a waterlogged vacuum transport system designed with 13 feet or more of total lift traditionally has needed operator assistance to purge the residual sewage. Because the valve opens in response to differential pressure based upon the vacuum pressure condition in the conduit immediately downstream of the valve, if that vacuum pressure is too low due to waterlogging blockage of the conduit, the valve will not cycle to introduce atmospheric pressure into the conduit, thereby preventing the conduit from automatically unwaterlogging itself over time. Instead, the repairman will have to restore the source of vacuum pressure in the system, move upstream to a valve having adequate vacuum pressure able to be activated and activate that valve, and then progressively activate each valve further upstream until the vacuum mains are cleared of the waterlogged sewage.

The second important aspect of the 13-foot measurement is that it presents a limitation on the overall length of the sewage transport lines. Combination of the predetermined slope of the lines with a maximum total lift of 13 feet determines the maximum distance the vacuum lines may travel to ensure proper sewage flow without the aid of mechanical pumps. Actually, the total permitted lift across the flow path is limited additionally by a frictional loss factor calculated according to various formulae known in the art of fluid dynamics.

In order to operate effectively a vacuum sewage system at loss levels exceeding about 13 feet, a higher air-to-liquid ratio is used. This may be simply accomplished by admitting more air into the conduit. Typical systems operating at or below the 13-foot level may be designed at a 3-to-1 air-to-liquid ratio. This number can be proportionately increased to increase lift within the system.

SUMMARY OF THE INVENTION

Accordingly, it is an object of the present invention to provide a vacuum sewage transport system which can automatically avoid waterlogging through a system component malfunction or misadjustment.

Another object of the present invention is to provide an apparatus which will act to open and close a vacuum valve to admit additional air to a vacuum main to avoid the vacuum main becoming waterlogged, independent of the normal activation of the vacuum valve to admit accumulated waste matter from a holding tank into the vacuum main.

Yet another object of the present invention is to allow the construction of vacuum sewage pipe networks with total lift exceeding 13 feet.

Briefly, the invention is directed to providing an EAAC apparatus and a method for automatically opening and closing an air control valve connected to a vacuum sewage transport conduit with a sewage control valve, independently of the level of accumulated sewage upstream of the sewage control valve, in order to inject additional air at atmospheric pressure into the vacuum transport lines to apply additional fluid pressure to a mass of sewage therein, and to avoid a waterlogged condition by supplementary transport. In its simplest form, the apparatus comprises a solenoid valve and a timer-unit. When the timer unit is activated, it in turn activates the solenoid valve which responds by delivering vacuum or subatmospheric pressure from an external source to the air control valve to open it by application of differential pressure. When the on-timer cycle is completed, atmospheric pressure is once again delivered to the air control valve to close the valve. The predetermined frequency and duration of timer activation is calculated to permit sufficient atmospheric air to be introduced into the transport conduit to, on average, prevent waterlogging.

In a preferred embodiment, a pressure switch and timer-delay module are added to the EAAC system. The pressure switch monitors the level of vacuum pressure differential in the transport conduit downstream of the control valve. When the vacuum pressure falls to or below a predetermined level, e.g., 12" Hg, the pressure switch activates the timer-delay component. When the timer-delay cycle is completed, if the level of vacuum pressure differential in the conduit line is still deficient, then the timer component is activated. This component in turn activates the solenoid valve.

Moreover, the timer-delay component is activated again, and the pressure switch remonitors the level of vacuum pressure in the transport conduit when the timer-delay cycle is completed. In another preferred embodiment, the timer and timer-delay components or modules have control knobs for adjusting the duration of their respective activation cycles.

In yet another preferred embodiment, the EAAC is combined in tandem with the sensor-controller module, which normally cycles the sewage vacuum control valve when a certain predetermined level of sewage is accumulated in a holding tank upstream of the sewage control valve. In this particular embodiment, the solenoid valve, when activated, responds by delivering atmospheric pressure from an external source to the sensor-controller module. This, in turn, acts to open the sewage control valve by application of differential pressure. When the timer cycle is completed, vacuum pressure is once again delivered to the sensor-controller module, which reverses the differential pressure process and, in turn, responds by closing the sewage control valve. In this particular embodiment, the special air control valves are unnecessary.

BRIEF DESCRIPTION OF THE DRAWINGS

FIG. 1 is a diagramatic representation of a vacuum sewage transport system containing the invention;

FIG. 2 is a schematic view of the electric air admission controller ("EAAC") of the invention connected to an air control valve in cross-section;

FIG. 3 is the same as FIG. 2 except that a pressure switch and delay-timer module have been added to the schematic diagram of the EAAC;

FIG. 4 shows the function of the various components on view in FIG. 3 as a function of time;

FIG. 5 shows the EAAC embodiment of FIG. 3 connected to a sensor-control module and the upper housing of a waste vacuum control valve; and FIG. 6 shows the function of various components on view in FIG. 5 as a function of time.

DETAILED DESCRIPTION OF THE PREFERRED EMBODIMENT

As illustrated in FIG. 1 of the drawings, the vacuum sewage transport system 10 includes a gravity sewer conduit 11 at atmospheric pressure which drains from a point of sewage inside a dwelling. The gravity sewer conduit 11 is arranged to convey sewage to a holding tank 12, which is also ordinarily maintained essentially at atmospheric pressure. A sensor pipe 13 is supported at the top of the holding tank 12 and extends downwardly to a point inside the tank. The sensor pipe 13 extends from its top support upwards into a valve pit 16 into which the sensor pipe 13 opens.

A holding tank discharge conduit 15, having an inlet opening 14, also is suspended down into holding tank 12. It extends upwards through valve pit 16 and eventually into a sewage collection station 22, remote from the valve pit 16. Interposed in the discharge conduit 15 within the valve pit 16 is a sewage control valve, generally designated 20. Details of the construction and operation of the control valve 20 may be found in applicant's U.S. Pat. No. 4,171,853 and applicant's co-pending application U.S. Ser. No. 366,585. In the operation of the vacuum sewage system, valve 20 is normally closed. Downstream from the control valve 20 in the discharge conduit 15, the line is maintained at subatmospheric or vacuum pressure, as is sewage collection station 22. Such a sewage collection station and the vacuum portion of the discharge conduit 15 between it and the control valve 20 are described and illustrated in applicant's U.S. Pat. No. 4,179,371.

During operation of the system, sewage is discharged from a residential source into the gravity sewer conduit 11, which in turn discharges the sewage into holding tank 12. When the sewage content of the holding tank is such that a discharge cycle is needed (triggered by preselected pressure conditions in the holding tank), the control valve 20 is opened by the sensor control apparatus 25, which will be described more fully below, and triggers a normal sewage transport cycle. Opening the control valve 20 creates a differential pressure between the relatively low pressure or vacuum portion of the discharge conduit 15 downstream from the valve, and the higher or atmospheric pressure portion of conduit 15 upstream of valve 20. This pressure differential results in the very rapid discharge of the sewage content of holding tank 12 through the inlet opening 14 of discharge conduit 15 past control valve 20, and into and through the vacuum portion of discharge conduit 15, and ultimately to collection station 22 for subsequent processing or disposal. Upon completion of the sewage transport cycle by discharge of sewage from holding tank 12 through the discharge conduit 15, the control valve 20 is automatically closed, and the vacuum system 10 is restored to its normal stand-by condition.

Upon the upper end 21 of control valve 20 is mounted an integrated sensor-controller module 25. The control module is attached by means of bracket 26 and screws 27 (best seen in FIG. 5). One of the ends of a pressure sensor conduit 28 is disposed in pressure communication with the sensor pipe 13, and its other end is coupled to pressure sensor port 31, positioned at the lowest point of the sensor-controller module 25. Vacuum is supplied to the sensor-controller through a vacuum line 34 connected through a surge tank 37, which is more fully described in applicant's U.S. Pat. No. 4,171,853. The surge tank communicates with the vacuum portion of discharge conduit 15, thereby supplying a constant subatmospheric or vacuum pressure source to the sensor-controller through vacuum line 34 and vacuum port 30.

Atmospheric pressure, on the other hand, is directed to the sensor-controller 25 from above the ground surface of the installation through an air breather 33, which communicates with an atmospheric pressure conduit 36, thereby supplying atmospheric pressure to the sensor-controller through atmospheric port 39 (as seen in FIG. 5).

At the same time, atmospheric pressure is delivered to the lower housing chamber of the pressure differentially operated valve 20 from atmospheric pressure conduit 36 via atmospheric pressure conduit 32, which joins the former at junction point 35.

The sensor-controller 25 communicates with the pressure differentially operated valve 20 via a valve connector 42 disposed in pressure communication with the upper end 21 of valve 20 and valve connector port 45 of module 25 (see FIG. 5).

The EAAC module 17 is designed to open the control valve 20 to admit atmospheric air during an air transport cycle of predetermined length in order to prevent the onslaught of, or correct the existence of, a waterlogged condition in the sewage transport conduit 15. The simplest manner to achieve this objective is to join one or more air valves 46 coupled to an EAAC module 17 at strategic locations in the conduit line 15 by means of a connecting conduit 48, as shown in FIG. 2. These air valves 46 are independent of the sewage control valves 20 positioned immediately downstream of each sewage holding tank 12 (as shown in FIG. 1), but have the same mechanical structure, and operate in the same manner.

The details of the structural and functional interaction of the pressure differentially operated air valve 46 and sewage control valve 20 and the valve connector 42 are discussed in great detail in applicant's U.S. Pat. No. 4,171,853 and U.S. Ser. No. 366,585. Basically, air valve 46 has a wye-body conduit 50 with a valve housing 51 and an internal valve seat 53. Mounted to valve housing 51 are a lower housing chamber 55 and an upper housing chamber 57, divided by diaphragm 60. One end of plunger assembly 62 mates with internal valve seat 53 in order to provide an air and water-tight seal. Plunger assembly 62 is attached to piston rod 65 and can move longitudinally within valve housing 51. The other end of piston rod 65 is attached to piston-cup 67. Spring 70 is positioned between piston-cup 67 and the top side 21 of upper housing chamber 57 in order to bias plunger assembly 62 tightly in contact with internal valve seat 53.

In the standby position with plunger assembly 62 sealed against internal valve seat 53 (i.e., "closed" position), the upper housing chamber 57 is at atmospheric pressure. Meanwhile, air at atmospheric pressure enters wye-body conduit 50 to fill valve housing 51 and lower housing chamber 55 at all times. However, when vacuum or subatmospheric pressure enters the upper housing chamber 57 through valve connector 42, the atmospheric pressure in lower housing chamber 55 deflects diaphragm 60 upwards toward the top side 21 of upper housing chamber 57. This action, in turn, moves piston cup 67 against spring 70 and with it piston rod 65 so that plunger assembly 62 moves away from internal valve seat 53. In this way the valve "opens." Once atmospheric pressure is returned to upper housing chamber 57, the process reverses and the valve closes. Thus, the key to opening air control valve 46 is to introduce vacuum or subatmospheric pressure into upper housing chamber 57.

FIG. 2 also shows a schematic diagram of EAAC module 17 in its simplest form. A 3-way, 2-position, spring-return electric actuated valve ("solenoid valve") 80 is used to deliver air at a selected pressure condition to valve connector 42 and upper housing chamber 57 of air valve 46 by means of pressure delivery line 82. At the same time, solenoid valve 80 receives air at atmospheric pressure by means of atmospheric pressure source 84, and vacuum or subatmospheric pressure by means of vacuum line 86. The source 87 of the vacuum or subatmospheric pressure could be either a vacuum pump or else the vacuum or subatmospheric pressure within conduit line 15, itself.

While many different models and brands of solenoid valves may be used in the present invention, applicant employs a particular solenoid valve Model No. B15DK1040 made by the Skinner Valve Division of Honeywell. In response to electrical current provided by power source 90, a magnetic coil in the solenoid valve 80 will cause, by means of interaction of the mechanical parts, vacuum or subatmospheric pressure to be passed to upper housing chamber 57, and the air valve 46 opens. Termination of flow of electrical current to solenoid valve 80, by contrast, will cause atmospheric pressure to be delivered to the upper housing chamber 57, thereby closing the air valve 46.

If means is not provided to interrupt flow of electrical current to solenoid valve 80, however, then air valve 46 will perpetually be in the "open" position, forever flooding conduit line 15 with atmospheric pressurized air. This will thwart formation of a pressure differential in the conduit line 15, preventing swift transport of sewage when passed from holding tank 12 through control valve 20 during a sewage transport cycle (see FIG. 1). Therefore, a timer module 100 is interposed within the electrical circuit between power source 90 and solenoid valve 80. Typical timers used include those sold by National Controls Corporation of West Chicago, Ill. Such a timer provides an electrical flow path which is interrupted for a predetermined period of time. The timer may have means for adjusting this period of deactivation. Hence, solenoid valve 80 will receive electrical current only when the timer module 100 is activated to complete the electrical circuit. In this way, air valve 46 will cycle to provide intermittent introduction of air at atmospheric pressure in conduit line 15 to prevent waterlogging.

A preferred embodiment of the present invention is shown in FIG. 3. Rather than adjust the timer module's activation period to produce an air transport cycle for the air valve 46 sufficiently long, on average, to prevent the differential pressure in the conduit line from falling to or below a predetermined level, such as 12" Hg, a pressure-activated, double-pull, single-throw electric switch ("pressure switch") 110 is placed in the electrical circuit of EAAC module 17 between power source 90 and on-timer module 100. A typical pressure switch used is the combination of Switch Unit No. PB30A and Transducer Unit No. RV34A32, both sold by Automatic Switch Co. of Florham Park, N.J. Vacuum line 112 supplies to pressure switch 110 a steady stream of vacuum/subatmospheric pressurized air from a point in conduit 48 which joins air valve 46 and conduit line 15. A surge tank 114 may be interposed within vacuum line 112 to prevent any waste liquids that might have flown into conduit 48 from migrating into pressure switch 110. Pressure switch 110 is activated, and therefore allows electric current to flow from power source 90 to the timer module, when the vacuum pressure condition delivered to it falls to or below 12" Hg.

Every time air valve 46 cycles, however, air at atmospheric pressure (defined as 0" Hg) overwhelms the vacuum pressure condition existing in conduit 48 immediately downstream of the valve. Thus, the pressure difference at this point falls temporarily to 0" Hg until plunger assembly 62 seals air valve 46 to terminate the air transport cycle and the source of vacuum pressure in vacuum sewage transport system 10 can restore the vacuum condition (and therefore the pressure differential) to conduit 48. Because of this sudden loss in pressure differential, pressure switch 110 would be activated every time air valve 46 cycles which, in turn, would cause EAAC module 17 to cycle air valve 46 once again to admit more atmospheric air into conduit line 15 even though the line was not waterlogged, or even close to being waterlogged. As may be readily seen, such an arrangement of equipment would create perpetual cycling of air valve 46 which not only would place undue wear on the valve and components of EAAC module 17, but also would prevent vacuum pressure from being restored to conduit line 15, so that when waste control valve 20 cycled in response to accumulated sewage in holding tank 12, there would be insufficient pressure differential to transport the sewage to sewage collection station 22. This, in turn, would foster waterlogging in conduit line 15, precisely the result which this invention seeks to prevent.

Therefore, a delay-timer module 105 is interposed within the electrical circuit of EAAC module 17 between pressure switch 110 and on-timer module 100. Delay-timer module 105 and on-timer module 100 are combined in time delay relay modules such as Model CKK sold by National Controls Corporation of West Chicago, Ill. Delay-timer module 105 ameliorates the problem of perpetual cycling of air valve 46 by turning to the "off" position when voltage is delivered to it, thereby commencing a delay cycle. At the end of the preselected period of delay, the delay-timer module 105 changes to the "on" position and delivers voltage to on-timer module 100. If at this time pressure switch 110 still determines that the pressure differential in conduit 48 is deficient, then on-timer module 100 will convert to the "on" position (commencing a timer cycle) and deliver current to solenoid valve 80, which thereby causes vacuum/subatmospheric pressure to be delivered to upper housing chamber 57 of air valve 46, and air valve 46 opens to admit atmospheric pressure to conduit line 15.

At the end of the predetermined timer cycle of on-timer module 100, it will convert to the "off" position, to deactivate solenoid valve 80, and the process will reverse to close air valve 46. Meanwhile, delay-timer module 105 will activate once again to provide a delay period to allow vacuum/subatmospheric pressure to be restored to conduit 48 immediately downstream of air valve 46. Both delay-timer module 105 and on-timer module 100 may have control knobs which permit the time of activation of each unit to be independently adjusted.

While a predetermined differential pressure value of 12" Hg has been chosen for illustrative purposes in this application, it should be understood that pressure switch 110 may be adjusted to monitor other preselected levels of differential pressure. Also, as indicated in FIG. 2 and 3, power source 90 delivers electrical current at 110 volts. However, this requires the installation of an electrical power wire in the valve pit to make such an amount of voltage available to operate the EAAC unit. Therefore, the components in the EAAC unit may be replaced with corresponding ones which perform similar functions, but operate on 12 volts, so that a simple 12-volt battery can be placed in the valve pit to operate the EAAC unit.

FIG. 4 illustrates the interrelation of the various components of EAAC module 17 and air valve 46 in terms of function v. time. At time $t_1$, the pressure differential in conduit line 15 is sufficient, atmospheric pressure is delivered to air valve 46 to keep it closed, and pressure switch 110, delay-timer module 105 and on-timer module 100 are all deactivated ("off"). At time $t_2$, the pressure differential condition becomes deficient, pressure switch 110 is activated and delay-timer module 105 is activated to commence the delay cycle. At time $t_3$, delay-timer module 105 deactivates, the pressure condition is still deficient, and on-timer module 100 activates to activate solenoid valve 80. Meanwhile, vacuum/subatmospheric pressure is delivered to air valve 46 to open it. At time $t_4$, the on-timer module 100 deactivates as does the solenoid valve 80, and atmospheric pressure is once again delivered to air valve 46 to close it. In the meantime, delay-timer module 105 is once again activated. The delay cycle ends at time $t_5$ at which point the pressure condition in conduit line 15 is sufficient to avoid waterlogging. At time $t_6$, the pressure differential is deficient, and the process begins once again.

FIG. 5 shows yet another preferred embodiment of the invention. As revealed in FIG. 1, a unit-controller module 25 regulates the cycling of waste control valve 20. Applicant's U.S. Pat. No. 4,373,838 discloses in great detail the structure and operation of the unit-controller module. Basically, the module has air-tight chambers 120, 122, 124, 126, 128, and 130. Vacuum line 34, surge tank 37, and vacuum port 30 ensure that chamber 128 is always maintained at the vacuum/subatmospheric pressure condition in conduit line 15 immediately downstream of control valve 20. Air breather 33, atmospheric pressure conduit 36, atmospheric port 39, and conduit 132 ensure that chambers 130 and 122 are always at atmospheric pressure. Meanwhile, connecting tube 134 brings chambers 124 and 126 to the same vacuum/atmospheric pressure condition which exists in chamber 128. And finally, sensor pipe 13, pressure sensor conduit 28, and pressure sensor port 31 conveys the pressure condition in holding tank 12 (which increases as the level of sewage increases) to chamber 120.

In the stand-by position, valve connector port 45 and valve connector 42 deliver atmospheric pressure to the upper housing chamber 57 of waste control valve 20. However, when the pressure build-up in chamber 120 reaches a certain level, pressure communication between the various chambers shuts off delivery of atmospheric pressure from atmospheric port 39 to valve connector 42, and instead vacuum/subatmospheric pressure is delivered from chamber 128 to chamber 130, valve connector 42, and hence upper housing chamber 57 to cause opening of the waste control valve 20. Reversal of this process causes closure of the valve. Thus, like the embodiment of the invention in FIGS. 2 and 3, the unit-controller module 25 opens and closes the valve by delivering vacuum/subatmospheric and atmospheric pressurized air, respectively.

The invention embodied in FIG. 5 connects the EAAC module 17 to the unit-controller module 25, instead of directly to the valve as embodied by the inventions shown in FIGS. 2 and 3. This promotes efficiency and reduces costs because it eliminates the need for special air control valve 46 to admit atmospheric air into conduit line 15. Sewage control valve 20 must already be used to admit sewage into the conduit transport lines, so this valve serves a second function by also allowing entry of atmospheric air when needed to avoid waterlogging in the conduit line 15.

The EAAC module 17 is constructed and operated in the same way as when the EAAC module is connected directly to the valve with one important exception: the atmospheric and vacuum/subatmospheric pressure delivery lines 84 and 86, respectively, connected to solenoid valve 80 are reversed. In this way, compared with each respective position of two-way position solenoid valve 80 in FIGS. 2 and 3, the pressure characteristic of air exiting the solenoid valve and delivered to chamber 124 of the unit-controller module 25 in FIG. 5 will be reversed. Hence, when vacuum/subatmospheric pressure is conveyed via pressure delivery line 82 and connecting tube 134 to chamber 124 of unit-controller module 25, the unit controller is in its stand-by condition which in turn delivers atmospheric pressure to waste control valve 20 to close it. But when atmospheric pressure is conveyed via pressure delivery line 82 and connecting tube 134 to chamber 124, pressure communication between the various chambers of the unit-controller module 25 will cause it to deliver vacuum/subatmospheric pressure to the upper housing chamber 57 of sewage control valve 20 to effect its opening. As is the case with the inventions embodied in FIGS. 2 and 3, the timer cycle of on-timer unit 100 will determine the duration of the air transport cycle of waste control valve 20 while it is being activated by EAAC module 17, and therefore how much air at atmospheric pressure can enter conduit line 15 to prevent or cure any waterlogging. Also like the inventions embodied in FIGS. 2 and 3, delay-timer module 105 and on-timer module 100 may be equipped with control knobs to vary the length of their activation cycles. This will determine not only the length of the air transport cycle of waste control valve 20, but also the duration of delay caused by timer-delay module 105 both before and after control valve 20 cycles to ensure that the inadequate pressure differential in conduit line 15 monitored by pressure switch 110 is not unduly transitory.

It should be noted that the embodiment of the invention connecting EAAC unit 17 to unit-controller module 25, instead of directly to the control valve, could use an EAAC module without the pressure switch 110 and delay-timer module 105 (as shown in FIG. 2), merely cycling the control valve every time the on-timer module 100 is activated to, on average, ensure that waterlogging does not occur or eliminate it after it occurs.

FIG. 6 shows the invention, as embodied in FIG. 5, in terms of the various component functions versus time. Comparison of FIG. 6 with FIG. 4 will show the primary differences functionally between the inventions of FIG. 5 and FIG. 3.

While particular embodiments of the invention have been shown and described, it should be understood that the invention is not limited thereto, since many modifications may be made. For instance, rather than use electricity as the means of operative communication between various components of the system, the air admission controller could employ fluidics and function with equally desirable results. The invention is therefore contemplated to cover by the present application any and all such modifications which fall within the true spirit and scope of the basic underlying principles disclosed and claimed herein.

What is claimed is:

1. An air admission controller for automatically regulating the opening and closing of a control valve connected to a vacuum sewage transport conduit to admit atmospheric pressure into the conduit, comprising:
   a timer unit having a first activated condition and a second inactivated condition;

a source of vacuum or subatmospheric pressure;

a source of atmospheric pressure;

means, operatively in communication with said timer unit, for establishing communication of one of these pressure conditions with the control valve, which, in response thereto, either opens or closes the valve to commence or terminate an air transport cycle within the transport conduit, wherein vacuum or subatmospheric pressure is delivered while said timer is in one condition, and wherein atmospheric pressure is delivered while said timer is in another condition; and a housing for containing the components of the air admission controller.

2. An air admission controller as recited in claim 1, wherein said means for establishing pressure communication is a solenoid valve.

3. An air admission controller as recited in claim 1, wherein vacuum or subatmospheric pressure is delivered to the control valve when the pressure differential within the sewage transport conduit downstream of the control valve is at or below a preselected level.

4. An air admission controller as recited in claim 3, wherein the preselected pressure differential level is 12" Hg.

5. An air admission controller as recited in claim 1, wherein said timer has control means for adjusting the duration of the air transport cycle.

6. An air admission controller for automatically regulating the opening and closing of a control valve connected to a vacuum sewage transport conduit to admit atmospheric pressure into the conduit, comprising:

a timer unit having a first activated condition and a second inactivated condition;

a timer-delay module, operatively in communication with said timer unit, which activates and deactivates to commence and terminate a delay cycle, said timer unit activates to commence the air transport cycle of the control valve only if the pressure differential in the vacuum transport conduit is at or below a preselected level after said delay cycle terminates, and another delay cycle is caused by said timer-delay module after the termination of the air transport cycle;

means for determining the pressure differential existing in the vacuum sewage transport conduit downstream of the control valve, wherein said pressure determining means activates said timer-delay module when the pressure differential is at or below the preselected level;

a source of vacuum or subatmospheric pressure;

a source of atmospheric pressure;

means operatively in communication with said timer unit for establishing communication of one of these pressure conditions with the control valve, which, in response thereto, either opens or closes the valve to commence or terminate an air transport cycle within the transport conduit, wherein vacuum or subatmospheric pressure is delivered while said timer unit is in another condition; and a housing for containing the components of the air admission controller.

7. An air admission controller as recited in claim 6, wherein said pressure determining means is a pressure switch.

8. An air admission controller as recited in claim 6, wherein said means for establishing pressure communication is a solenoid valve.

9. An air admission controller as recited in claim 6, wherein said timer-delay module has control means for adjusting the duration of the delay cycle.

10. An air admission controller as recited in claim 6, wherein said timer has control means for adjusting the duration of the air transport cycle.

11. An air admission controller as recited in claim 6, wherein the preselected pressure differential level is 12" Hg.

12. An air admission controller as recited in claim 6, wherein said pressure delivery means is connected to a pressure differential operating apparatus, which, in turn, is connected to the control valve, whereby atmospheric pressure is delivered to the operating apparatus which conveys vacuum or subatmospheric pressure to the control valve to commence an air-transport cycle while said timer unit is activated, and vacuum or subatmospheric pressure is delivered to the operating apparatus which conveys atmospheric pressure to the control valve to terminate the air transport cycle while said timer unit is deactivated.

13. An air admission controller for automatically regulating the opening and closing of a control valve connected to a vacuum sewage transport conduit to admit atmospheric pressure into the conduit, comprising:

a timer unit having a first activated condition and a second inactivated condition, and control means for adjusting the duration of an air transport cycle;

a timer-delay module, operatively in communication with said timer unit, which activates and deactivates to commence and terminate a delay cycle, said timer unit activates to commence the air transport cycle of the control valve only if the pressure differential in the vacuum transport conduit is at or below a preselected level after said delay cycle terminates, another delay cycle is caused by said timer-delay module after the termination of the air transport cycle, and said timer-delay module has control means for adjusting the duration of the delay cycle;

a pressure switch for determining the pressure differential existing in the vacuum sewage transport conduit downstream of the control valve, wherein said pressure switch activates said timer-delay module when the pressure differential is at or below 12" Hg.

a source of vacuum or subatmospheric pressure;

a source of atmospheric pressure;

a solenoid valve operatively in communication with said timer unit for establishing communication of one of these pressure conditions with the control valve, which, in response thereto, either opens or closes the valve to commence or terminate an air transport cycle within the transport conduit, wherein vacuum or subatmospheric pressure is delivered while said timer unit is in another condition; and a housing for containing the components of the air admission controller.

14. An air admission controller as recited in claim 13, wherein the preselected pressure differential level is 12" Hg.

15. An air admission controller as recited in claims 1, 6, or 13, wherein the operative means of communication between at least two of the components is fluidics.

16. An air admission controller as recited in claims 1, 6, or 13, wherein the operative means of communication between at least two of the components is electricity.

17. An air admission controller as recited in claim 13, wherein said solenoid valve is connected to a pressure differential operating apparatus, which, in turn, is connected to the control valve, whereby atmospheric pressure is delivered to the operating apparatus which conveys vacuum or subatmospheric pressure to the control valve to commence an air-transport cycle while said timer unit is activated, and vacuum or subatmospheric pressure is delivered to the operating apparatus which conveys atmospheric pressure to the control valve to terminate the air transport cycle while said timer unit is deactivated.

18. A method for automatically regulating the opening and closing of a control valve to inject air at atmospheric pressure into a vacuum sewage transport conduit containing waste mass, independently of the level of accumulated sewage, to avoid a waterlogged condition, comprising:

monitoring the pressure differential level within the vacuum transport conduit downstream of the control valve;

activating a delay-timer module by means of a pressure switch when the vacuum pressure falls to or below a preselected level;

activating a timer module if the vacuum pressure is at or below the predetermined level once said delay-timer module deactivates;

activating a solenoid valve, whereby vacuum or subatmospheric pressure is delivered to the control valve;

deactivating said solenoid valve once said timer module deactivates, whereby atmospheric pressure is delivered to the control valve; and activating the delay-timer module to cause another delay cycle.

19. A method for activating a pressure differential operating apparatus as recited in claim 18, further comprising the step of adjusting the duration of the activation cycle of said delay-timer module.

20. A method for activating a pressure differential operating apparatus as recited in claim 18, further comprising the step of adjusting the duration of the activation cycle of said timer module.

21. A method for activating a pressure differential operating apparatus as recited in claim 18, wherein said pressure switch activates said delay-timer module when the vacuum pressure is at or below 12" Hg.

* * * * *